United States Patent
Arntzen et al.

(10) Patent No.: US 8,339,891 B2
(45) Date of Patent: Dec. 25, 2012

(54) POWER SAVINGS AND/OR DYNAMIC POWER MANAGEMENT IN A MEMORY

(75) Inventors: Eskild T. Arntzen, Cheyenne, WY (US); Jackson L. Ellis, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 218 days.

(21) Appl. No.: 12/957,569

(22) Filed: Dec. 1, 2010

(65) Prior Publication Data

US 2011/0296214 A1 Dec. 1, 2011

Related U.S. Application Data (60) Provisional application No. 61/347,854, filed on May 25, 2010.

(51) Int. Cl.
*G11C 7/00* (2006.01)
(52) U.S. Cl. ............... 365/226; 365/227; 365/233.1
(58) Field of Classification Search ............ 365/226, 365/227, 189.05, 233.1
See application file for complete search history.

(56) References Cited

U.S. PATENT DOCUMENTS

| | | | | |
|---|---|---|---|---|
| 6,058,063 A * | 5/2000 | Jang | ............ | 365/189.05 |
| 6,930,949 B2 * | 8/2005 | Schaefer | ............ | 365/227 |
| 7,379,373 B2 * | 5/2008 | Lorenz et al. | ............ | 365/226 |
| 7,453,756 B2 * | 11/2008 | Moyer et al. | ............ | 365/226 |
| 2007/0130482 A1 | 6/2007 | Dahan et al. | ............ | 713/300 |
| 2008/0162980 A1 | 7/2008 | Dahan et al. | ............ | 713/601 |

OTHER PUBLICATIONS

JEDEC Standard, Double Data Rate (DDR) SDRAM Specification, JESD79E, JEDEC Solid State Technology Association, May 2005, 85 pages.
JEDEC Standard, DDR2 SDRAM Specification, JESD79-2C, JEDEC Solid State Technology Association, May 2006, 119 pages.
JEDEC Standard, DDR3 SDRAM Standard, JESD79-3, JEDEC Solid State Technology Association, Jun. 2007, 188 pages.

* cited by examiner

*Primary Examiner* — Son Dinh
(74) *Attorney, Agent, or Firm* — Christopher P. Maiorana, PC (57) ABSTRACT

An apparatus comprising a plurality of buffers and a memory controller. The plurality of buffers may each be configured to generate an access request signal in response to a respective one of a plurality of channel requests received from a respective one of a plurality of clients. The memory controller circuit may be configured to generate a clock enable signal in response to the plurality of access request signals. The clock enable signal may be configured to initiate entering and exiting a power savings mode of a memory circuit.

18 Claims, 6 Drawing Sheets

POWER SAVINGS AND/OR DYNAMIC POWER MANAGEMENT IN A MEMORY

This application claims the benefit of U.S. Provisional Application No. 61/347,854, filed May 25, 2010 and is hereby incorporated by reference in its entirety.

The application may also relate to co-pending application Ser. No. 12/857,716, filed Aug. 17, 2010, Ser. No. 12/899,681, filed Oct. 7, 2010 and Ser. No. 12/878,194, filed Sep. 9, 2010, which are each hereby incorporated by reference in their entirety.

FIELD OF THE INVENTION

The present invention relates to memories generally and, more particularly, to a method and/or apparatus for implementing power savings and/or dynamic power management for a memory through arbiter and protocol engine collaboration.

BACKGROUND OF THE INVENTION

Conventional memory controllers generally limit power management capabilities to firmware controlled implementations. Such approaches only allow deep, long-term, power reduction modes to be used given the relative slowness of the processor compared to the fast nature of the memory controller. Given the ever increasing need for power reduction, the capabilities of existing buffer controllers are inadequate, leaving a significant potential for power reduction untapped.

Conventional power savings implementations for a DDR system only allow firmware control of a deep-sleep power down mode. Such implementations suspends all buffer activity and places the DDR memory in a self-refresh state to preserve memory content and/or reduce power consumption. Such implementations only work for longer, planned periods of inactivity.

A clock enable (CKE) power-down is a feature specified in the JEDEC standard for DDR memories. However, the JEDEC specified feature only deals with the memory, not how a controller should implement support for this feature (apart from the implication that the controller must meet whatever timing requirements are set out in the JEDEC standard).

Existing power management solutions do not reduce power consumption while the system-on-a-chip is in an active operational state. Existing power management solutions only operate when activity is completely suspended.

It would be desirable to implement hardware controlled power savings control for a memory using an arbiter and/or protocol engine collaboration and/or to dynamically enter and exit a low power state mode during normal operation of the memory.

SUMMARY OF THE INVENTION

The present invention concerns an apparatus comprising a plurality of buffers and a memory controller. The plurality of buffers may each be configured to generate an access request signal in response to a respective one of a plurality of channel requests received from a respective one of a plurality of clients. The memory controller circuit may be configured to generate a clock enable signal in response to the plurality of access request signals. The clock enable signal may be configured to initiate entering and exiting a power savings mode of a memory circuit.

The objects, features and advantages of the present invention include a memory that may (i) provide a power savings feature, (ii) work with the arbiter to eliminate or minimize overhead due to power down, (iii) work seamlessly with existing refresh logic, (iv) allow a power down any time a protocol engine returns to idle and the memory is precharged, (v) be implemented without firmware interaction after initial setup, (vi) allow dynamic power reduction any time that there is not a need for buffer access for a few clocks or longer, (vii) be transparent to a user and/or firmware and/or (viii) work automatically with existing refresh logic.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
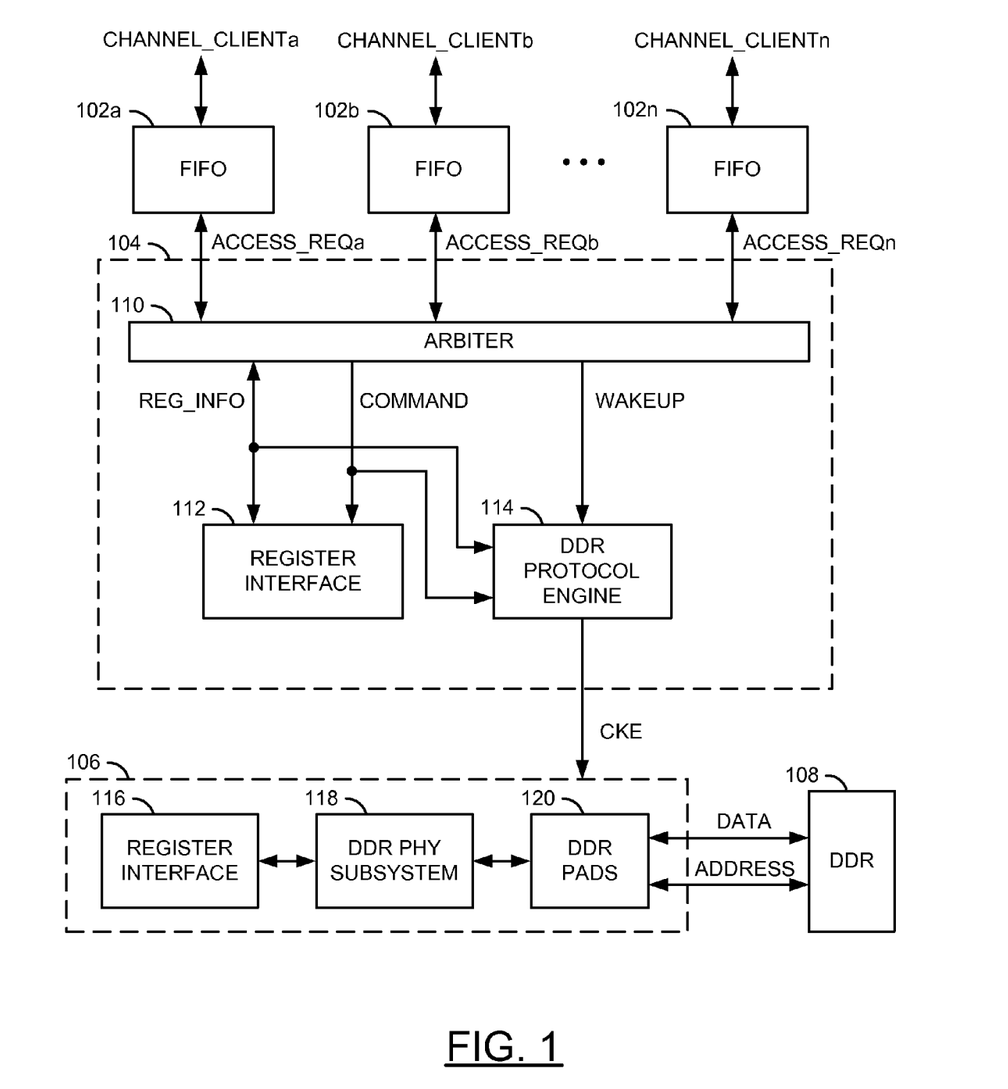
FIG. 1 is a diagram of an implementation of the present invention.

Referring to FIG. 1, a block diagram of a system 100 is shown in accordance with a preferred embodiment of the present invention. The system 100 generally comprises a plurality of blocks (or circuits) 102a-102n, a block (or circuit) 104, a block (or circuit) 106 and a block (or circuit) 108. The circuits 102a-102n may be implemented as a buffer circuits. For example, the circuits 102a-102n may be implemented as First-In First-Out (FIFO) memory circuits. The circuit 104 may be implemented as a memory controller circuit. The circuit 106 may be implemented as a memory PHY interface circuit. In one example, the circuit 106 may be implemented as a DDR PHY interface circuit. The circuit 108 may be implemented as a memory circuit.

The circuit 104 generally comprises a block (or circuit) 110, a block (or circuit) 112 and a block (or circuit) 114. The circuit 110 may be implemented as an arbiter circuit. The circuit 112 may be implemented as a register interface circuit. The circuit 114 may be implemented as a protocol engine circuit. In one example, the circuit 114 may be implemented as a DDR protocol engine circuit.

The circuit 106 generally comprises a block (or circuit) 116, a block (or circuit) 118 and a block (or circuit) 120. The circuit 116 may be implemented as a register interface circuit. The circuit 118 may be implemented as PHY subsystem circuit. In one example, the circuit 118 may be implemented as a DDR PHY subsystem circuit. The circuit 120 may be implemented as a memory pad circuit. In one example, the circuit 120 may be implemented as a DDR pad circuit. The circuit 104 and the circuit 106 illustrate details of an example data path. In one example, the memory circuit 108 may be implemented as an external memory circuit (e.g., on a separate integrated circuit from the circuits 102a-102n). In another example, the memory circuit 108 may be implemented as an internal memory circuit (e.g., implemented on an integrated circuit along with the circuits 102a-102n, the circuit 104 and/or the circuit 106). In one example, memory circuit 108 may be implemented as a dynamic random access memory (DRAM). The particular type of DRAM implemented may be, varied to meet the design criteria of a particular implementation. In another example, the memory circuit 108 may be a double data rate (DDR) memory circuit. The memory circuit 108 may comprise a power down mode and/or another lower function mode. The memory controller 104 may enter and/or exit the power down mode while minimizing delay with respect to the memory protocol delay. The memory circuit 108 may be implemented as a variety of types of memory circuits.

The FIFO circuits 102a-102n may allow each of the different requesters to operate at a frequency that is different from the frequency of the memory circuit 108. Such an implementation may allow a loose coupling between the particular requestor and the memory circuit 108. The buffer circuits 102a-102n may provide arbitration latency absorption.

The arbiter circuit 110 may perform independent arbitration for the memory circuit 108. The arbitration may be tuned to the particular type of memory implemented (e.g., the number of banks of a DDR, minimizing read/write transitions, etc.). The arbiter circuit 110 may determine which of the incoming requests to provide to the protocol engine 114. The particular type of arbitration method implemented may be varied to meet the design criteria of the overall system. In one example, the arbitration method implemented may be a simple priority. In another example, the arbitration method implemented may be a round robin.

The protocol engine circuit 114 may queue transfer requests received by the arbiter circuit 110. The arbiter circuit 110 may decide which of the transfer requests the protocol engine circuit 114 receives next. The protocol engine circuit 114 may process a selected transfer request from the arbiter circuit 110. The protocol engine 114 may control writes and/or reads of data to/from the memory circuit 108. The protocol engine 114 may be configured to run the particular protocol used by each type of memory.

The protocol engine 114 may implement DDR1, DDR2, and/or DDR3 protocol compliant with JEDEC standards (e.g., JESD79E published May 2005 (and subsequent revisions), JESD79-2C, published May 2006 (and subsequent revisions), and JESD79-3, dated June 2007 (and subsequent revisions)), which are incorporated by reference in their entirety. Other protocols, such as the DDR4 standard, which is currently being worked on by JEDEC committees, may also be implemented. The protocol engine 114 may use various programmable parameters to allow support for the full JEDEC range of devices in accordance with various known specifications. Firmware may be used to drive the DDR initialization sequence and then turn control over to the protocol engine 114. The protocol engine 114 may provide periodic refreshes that may be placed between quantum burst accesses. The protocol engine 114 control may support a precharge low-power mode as an automatic hardware initiated mode and a self-refresh low-power mode as a firmware initiated mode. The protocol engine 114 may also bank interleave each access with the previous access by opening the bank while the prior data transfer is still occurring. Other optimizations may be provided by the protocol engine 114 to reduce the overhead as much as possible in the implementation of the DDR sequences.

The subsystem 106 may be implemented as one or more hardmacro memory PHYs, such as the DDR1/2 or DDR2/3 PHYs. The subsystem 106 may be interfaced to the memory circuit 108 through the DDR pads 120. The DDR pads 120 may be standard memory I/F pads which may manage the inter-signal skew and timing. The DDR pads 120 may be implemented as modules that may either be used directly or provided as a reference to customer logic where the DDR pads 120 will be implemented. The DDR pads 120 may include aspects such as BIST pads, ODT, and/or controlled impedance solutions to make the DDR PHY 106 simple to integrate.

The register interface 112 and/or the register interface 116 may allow the memory controller circuit 104 and DDR PHY circuit 106 to reside on a bus for accessing registers within the subsystem. In one example, an ARM APB3 bus may be implemented. However, the particular type of bus implemented may be varied to meet the design criteria of a particular implementation. These registers may or may not directly allow access to the memory 108. The signals CHANNEL_CLIENTa-n may initiate write and/or read to the memory 108. The buffer circuits 102a-102n may generate a number of signals (e.g., ACCESS_REQa-n). The signals ACCESS_REQa-n may be access request signals. The arbiter 110 may generate a signal (e.g., WAKEUP), a signal (e.g., COMMAND) and a signal (e.g., REG_INFO). The circuit 114 may generate a signal (e.g., CKE) in response to the signal WAKEUP, the signal COMMAND and/or the signal REG_INFO. The circuit 112 may receive the signal COMMAND and/or the signal REG_INFO. The signal REG_INFO may comprise register information. The signal CKE may be a clock enable signal used by the circuit 106 to initiate entering and/or exiting a power savings mode of the memory 108. In particular, prior to reading and/or writing to the memory 108, the memory 108 normally exits the power savings mode. The memory 108 generally enters the power savings mode prior to entering an idle condition. The idle condition may comprise no read/write operations to the memory 108.

The memory circuit 108 may be implemented using any memory type of addressable memory currently available or potentially available in the future. The memory circuit 108 may be implemented as volatile memory. For example, the memory circuit 108 may be implemented as SDRAM, DRAM, etc. The memory circuit 108 may be implemented as volatile or non-volatile memory. In one example, the memory circuit 108 may be implemented as flash memory. The memory circuit 108 may be implemented as internal memory or external memory. A mixture of a variety of types of memory circuits may be implemented. The memory circuit 108 may write data in response to write transfer requests received from the protocol engine circuit 114. The memory circuit 108 may provide read data in response to read transfer requests received from the protocol engine circuit 114.

Each signal CHANNEL_CLIENTa-n may transfer data to/from the memory circuit 108. The signals CHANNEL_CLIENTa-n may be received from clients within the hard disk controller (to be described in more detail in connection with FIG. 6). The FIFO circuits 102a-102n may each receive data and/or requests for data from each respective CHANNEL_CLIENTa-n interface. The FIFO circuits 102a-102n may each buffer the data received. The FIFO circuit 102a-102n may also transfer requests to the arbiter 110. Each request may include information such as read/write direction, transfer length, and/or memory address. A buffer in the FIFO circuits 102a-102n may store read and/or write data temporarily as the data is transferred from the CHANNEL_CLIENTa-n to the memory circuit 108 on writes and/or from the memory circuit 108 to the CHANNEL_CLIENTa-n on reads.

For write operations, the signal CHANNEL_CLIENTa may first request a write transfer to the FIFO circuit 102a. The signal CHANNEL_CLIENTa may then transfer write data to the FIFO circuit 102a. Next, the FIFO circuit 102a may request a write transfer to the arbiter circuit 110. The DDR protocol engine circuit 114 may detect that the FIFO circuit 102a has asserted a transfer request. Such detection may occur as a result of the signal WAKEUP being asserted from the arbiter circuit 110 to the protocol engine circuit 114. The detection may occur before a write command is initiated by the arbiter circuit 110. As a result, the protocol engine circuit 114 may exit the low power mode before receiving the transfer requests from the arbiter circuit 110. The DDR protocol engine circuit 114 may then communicate protocol information to the DDR PHY circuit 106 and/or the memory circuit 108 so that the memory circuit 108 may exit a low power (or power savings) mode. Communication of the protocol information may occur as a result of the signal CKE bing asserted from the protocol engine circuit 114 to the memory PHY interface circuit 106.

The arbiter circuit 110 may evaluate all pending transfer requests and determine which request to transfer to the memory circuit 108. The request may then be communicated to the circuit 102a and to the DDR protocol engine 114. The signal COMMAND may communicate the request. The FIFO circuit 102a may deassert the transfer request to the arbiter 110. The arbiter 110 may detect when there are no pending access requests and may notify the protocol engine circuit 114 that the memory 108 may enter the idle condition. The signal WAKEUP may be deasserted after presenting the write request to the protocol engine circuit 114 and/or before the protocol engine has finished the protocol for the write request. Next, the DDR protocol engine circuit 114 may communicate protocol to the DDR PHY circuit 106 and/or the memory circuit 108 to open a bank and/or row for the transfer.

The DDR protocol engine 114 may receive write data from the FIFO circuit 102a and/or provide the data to the DDR PHY circuit 106 and the memory circuit 108. The DDR protocol engine circuit 114 may also communicate protocol to the DDR PHY 106 circuit and/or the memory 108 to close the bank for the completed write transfer. The protocol engine circuit 114 may notify the memory PHY circuit 106 to enter the low power mode after receiving the signal WAKEUP and/or finishing the protocol for the write command. The protocol engine circuit 114 may enter the low power state as a result of the signal CKE being deasserted. The memory circuit 108 may receive a copy of the CKE signal and may enter a low power mode when the signal CKE is set to a logic low (e.g., "0"). The memory circuit 108 may exit the low power mode when the signal CKE is set to a logic high (e.g., "1").

For read operations, the signals CHANNEL_CLIENTa may first request a read transfer to the FIFO circuit 102a. The FIFO circuit 102a may then request a read transfer to the arbiter 110. The DDR protocol engine circuit 114 may detect that the circuit 102a has asserted a transfer request as a result of the signal WAKEUP being asserted. This may occur before the read command reaches the protocol engine circuit 114 to provide the protocol engine circuit 114 the opportunity to exit the low power mode before receiving the transfer request signal from the arbiter 110. The DDR protocol engine circuit 114 may then communicate protocol information to the DDR PHY circuit 106 and/or the memory circuit 108 to take the memory 108 out of the low power mode as a result of the signal CKE being deasserted.

The arbiter circuit 110 may evaluate all pending transfer requests and determine which request to transfer to the memory circuit 108. The request may be communicated to the circuit 102a and/or the DDR protocol engine circuit 114 via the signal COMMAND. The circuit 102a may then deassert the transfer request to the arbiter circuit 110. The arbiter 110 may detect when there are no pending access requests and may notify the protocol engine circuit 114 that the memory 108 may enter the idle condition. The signal WAKEUP may be deasserted after presenting the read request to the protocol engine circuit 114 and/or before the protocol engine has finished the protocol for the read request. The DDR protocol engine 114 may communicate protocol information to the DDR PHY circuit 106 and the memory circuit 108 to open a bank and row for the transfer.

Next, the DDR protocol engine 114 may receive read data from the DDR PHY 106 and/or the memory circuit 108. The DDR protocol engine circuit 114 may then present the data to the FIFO circuit 102a. The FIFO circuit 102a may present the read data to the signals CHANNEL_CLIENTa-n. The DDR protocol engine 114 may communicate protocol to the DDR PHY circuit 106 and/or the memory circuit 108 to close the bank for the completed read transfer. The protocol engine circuit 114 may notify the memory PHY circuit 106 to enter the low power mode after receiving the signal WAKEUP and/or finishing the protocol for the read command. The protocol engine circuit 114 may enter the low power state as a result of the signal CKE being deasserted. The memory circuit 108 may receive a copy of the CKE signal and may enter a low power mode when the signal CKE is set to a logic low. The memory circuit 108 may exit the low power mode when the signal CKE is set to a logic high.

Figure 2:
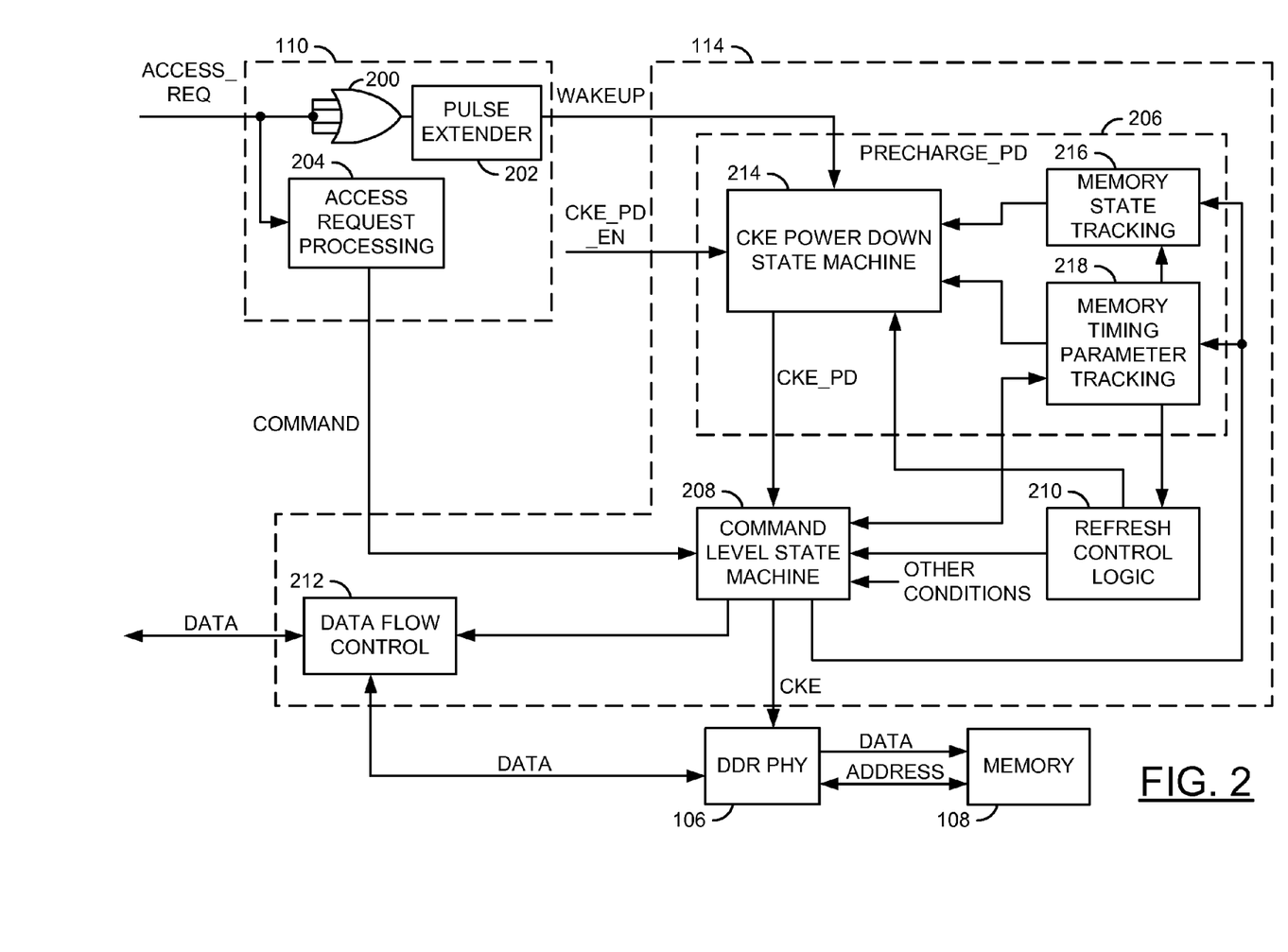
FIG. 2 is a more detailed diagram of the system of FIG. 1.

Referring to FIG. 2, a more detailed diagram of the arbiter circuit 110 and the protocol engine circuit 114 are shown. The arbiter circuit 110 generally comprises a block (or circuit) 200, a block (or circuit) 202 and a block (or circuit) 204. The circuit 200 may be implemented as a logic gate. In one example, the circuit 200 may be an OR logic gate. The circuit 202 may be implemented as a pulse extender circuit. The circuit 204 may be implemented as an access request processing circuit.

The protocol engine circuit 114 generally comprises a block (or circuit) 206, a block (or circuit) 208, a block (or circuit) 210 and a block (or circuit) 212. The circuit 206 may be implemented as a precharge power down circuit. The circuit 208 may be implemented as a command level state machine circuit. The circuit 210 may be implemented as a refresh control logic circuit. The circuit 212 may be implemented as a data flow control circuit. The circuit 206 generally comprises a block (or circuit) 214, a block (or circuit) 216 and a block (or circuit) 218. The circuit 214 may be implemented as a clock enable (CKE) power down state machine circuit. The circuit 216 may be implemented as a memory state tracking circuit. The circuit 218 may be implemented as a memory timing parameter tracking circuit.

The memory state tracking circuit 216 may verify that the memory circuit 108 is in idle before deasserting the clock enable signal CKE. The circuit 216 may receive inputs from the command level state machine circuit 208 to detect events such as DDR ACTIVE, READ/WRITE, and/or PRECHARGE. The circuit 216 may receive inputs from the memory timing parameter tracking circuit 218 to determine the delays that have occurred since the detected events. When all banks are idle, a precharge power down mode may be entered. This precharge power down mode may be performed by creating a counter for each bank that is loaded until the bank is idle again. The counters may count down to zero to indicate that all the banks are idle. The memory idle condition may be communicated to the power down state machine circuit 214.

The memory timing parameter tracking circuit 218 may include specific counters for various DDR memory timing parameters. For example, the circuit 218 may include tRAS, tRP, tCKE, tXP, tWR, refresh timing, and/or other timing parameters. The command level state machine circuit 208 may provide information regarding the occurrence of events pertaining to each of the timing parameters. Each timing parameter may have a counter that is loaded when the event occurs and counts down. When the counter reaches zero, the given timing parameter has been met. Indications of when timing parameters are still pending or met may be sent to the circuit 214, the circuit 216, the circuit 210 and/or the command level state machine circuit 208.

The refresh control logic circuit 210 may receive an indication from the memory timing parameter tracking circuit 218 when a refresh is needed. The refresh control logic circuit 210 may send a lower priority request to the command level state machine 208 for a refresh at the next convenient protocol boundary. In one example, a convenient protocol boundary may occur between a precharge and active event that was already planned because of the arbiter 110 command boundaries. If the command level state machine circuit 208 takes longer than a threshold to respond to the lower priority request, then the refresh control logic circuit 210 may present a higher priority request to the command level state machine circuit 208 to interrupt the current command in order to perform the refresh immediately. The refresh control logic circuit 210 may also send a signal to the state machine 214 when a refresh is needed.

The command level state machine 208 may perform non-precharge-power-down DDR protocols such as the ACTIVE, READ, WRITE, and/or PRECHARGE commands. The circuit 208 may perform the protocol necessary to implement the transfers in the order that the arbiter 110 has chosen. The access request processing circuit 204 may communicate the order of the transfers to the command level state machine circuit 208. The circuit 208 may also provide timing control information to the data flow control circuit 212. In one example, the timing control information may contain when data should be moved to and/or from the DDR PHY circuit 106. The circuit 208 may provide a signal to the memory state tracking circuit 216, the memory timing parameter tracking circuit 218, the data flow control circuit 212 and/or the DDR PHY circuit 106. The signal may contain information indicating protocol events.

The command level state machine 208 may receive an indication from the access request processing circuit 204 regarding the order to perform the transfer request. The command level state machine 208 may receive an indication from the power down state machine 214 indicating when to enter and/or exit a low power mode. The indication may determine when the signal CKE is asserted or deasserted. The signal CKE may be received by the DDR PHY circuit 106 from the command level state machine circuit 208. The command level state machine 208 may receive additional inputs. In one example, the command level state machine 208 may receive configuration information for performing protocol from the register interface 112. The signal CKE_PD may be presented from the power down state machine circuit 214 to the command level state machine circuit 208. The command level state machine 208 may set the signal CKE to a logic high or low in response to the signal CKE_PD. If the signal CKE_PD is asserted, the signal CKE may be set to a logic low (e.g., "0"). If the signal CKE_PD is deasserted, then the signal CKE may be set to a logic high (e.g., "1"). However, other logic variations for the signal CKE may be implemented to meet the design criteria of a particular implementation.

The data flow control circuit 212 may move data between the FIFO circuits 102a-102n and the DDR PHY circuit 106. The circuit 212 may receive timing control information regarding data flow between the FIFO circuits 102a-102n and the DDR PHY circuit 106 from the command level state machine circuit 208.

The access request processing circuit 204 may control the normal arbiter functions not related to the control signal WAKEUP. The logic gate 200 may detect when requests are active. The logic gate 200 may detect the earliest time that the protocol engine 114 may exit the precharge power down state. The logic gate 200 may present a signal to the pulse extender circuit 202. The pulse extender 202 may contain information regarding the number of clock cycles required to delay the falling edge of the logic gate 200 output by a desired amount. In one example, the number of clock cycles may be 8 cycles. However, the particular number of clock cycles may be varied to meet the design criteria of a particular implementation. Delaying the falling edge of the output of the logic gate 200 may allow the wakeup event to last long enough so that the new request may be received by the protocol engine circuit 114 before the falling edge of the wakeup occurs. The signal ACCESS_REQ may be set to a logic low (e.g., "0") once the access request processing circuit 204 indicates a winning arbitration. The signal WAKEUP may be sent to the access request processing circuit 204 and/or the precharge control circuit 206. The signal WAKEUP may be implemented as a memory controller wakeup signal.

The power down state machine circuit 214 may provide the power down sequencing control for the protocol engine 114. The sequencing control may contain information regarding when the command level state machine circuit 208 may enter and/or exit the precharge power down mode. The signal CKE_PD_EN may be presented by the register interface 112 to enable the circuit 214 to perform power down sequences.

The DDR PHY circuit 106 may present the signal CKE and/or other DDR command information received from the command level state machine circuit 208 to the memory circuit 108. The DDR PHY circuit 106 may pass write data from the data flow control circuit 212 to the memory circuit 108. The DDR PHY circuit 106 may control the timing of the interface signals to the memory circuit 108. The DDR PHY circuit 106 may also capture read data from memory circuit 108 and/or return the read data to the data flow control circuit 212.

The arbiter circuit 110 and the memory controller 104 may interact to optimize the use of the DDR memory CKE active power down feature. The early wakeup signal (e.g., WAKEUP) from the arbiter circuit 110 may be one or more clocks ahead of the access request reaching the memory controller 104. This may reduce the overhead associated with using the power savings control. A signal from the refresh logic circuit 210 may be presented to the power down state machine circuit 214 to ensure that if a refresh is necessary, the signal CKE_PD is asserted during the refresh command.

The signal WAKEUP may be asserted by the arbiter circuit 110 for an extended period of time to ensure that the power down state machine 214 acknowledges the signal for the duration of time needed to reassert the signal CKE_PD. The signal WAKEUP may arrive early enough to avoid overhead when using the power down mode. The signal WAKEUP may be based on any information that the arbiter 110 has indicating a buffer access request is imminent. The power savings control may also interact with the refresh control logic circuit 210 to ensure that the signal CKE is asserted when a refresh needs to occur.

The power savings mode, when enabled, may remove the clock enable signal CKE for the external memory circuit 106 when the memory controller 104 is idle. This low power state may be maintained until an early warning signal (e.g., WAKEUP) is received. The signal WAKEUP may contain an imminent buffer access request from the arbiter circuit 110 or the memory controller 104 requests a refresh cycle. In both cases, the memory controller 104 may exit the power down state and prepare to service the appropriate request. Therefore, little or no overhead occurs when the system 100 enters the power savings mode since the memory controller 104 generally fully enables the memory circuit 108 by the time the request for access reaches the protocol engine circuit 114.

The power savings mode may work with the arbiter circuit 110 to eliminate or minimize overhead due to the power down. The power savings mode may work with existing refresh logic. The power savings mode may allow power down any time the protocol engine circuit 114 returns to idle and the memory circuit 108 is precharged. The power savings mode may be implemented without firmware interaction after the initial setup.

The signal WAKEUP from the arbiter circuit 110 may contain incoming access requests which may minimize performance loss. Dynamic power reduction may be implemented any time buffer access is not needed for a certain number of clock cycles. In one example, dynamic power reduction may be implemented any time buffer access is not needed for one clock cycle. In another example, dynamic power reduction may be implemented any time buffer access is not needed for three clock cycles. However, the number of clock cycles may be varied to meet the design criteria of a particular implementation. The power savings mode may be transparent to a user and/or firmware. The power savings mode may work automatically with existing refresh logic. The power savings mode may be used anywhere where a common, arbitrated resource is shared to allow the resource to be powered down to reduce power consumption dynamically. Detection of the signal WAKEUP may occur at the earliest location in the system where a new transfer request may be processed. In one example, detection of the signal WAKEUP may occur after the buffers 102a-102n. In another example, detection of the signal WAKEUP may occur before the buffers 102a-102n and/or in a client within the hard disk controller (to be described in FIG. 6).

Figure 3:
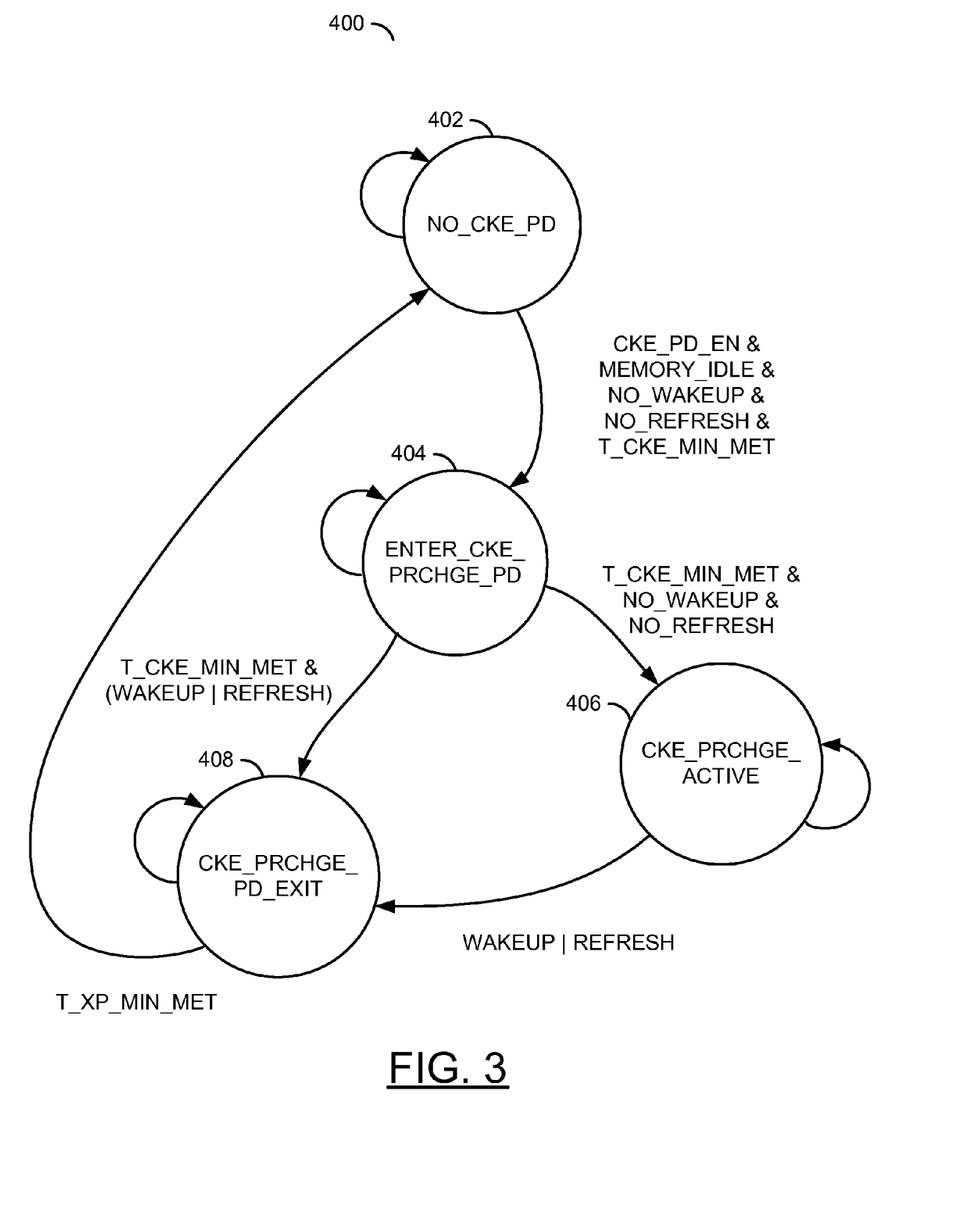
FIG. 3 is a state machine diagram of the present invention.

Referring to FIG. 3, a diagram of a state machine 400 is shown. The state machine 400 generally comprises a state 402, a state 404, a state 406 and a state 408. The state machine 400 may start in the state 402. The state machine 400 may have an output that may present the signal CKE_PD. When the signal CKE_PD is set to a logic high (e.g. "1"), the memory 108 may enter a lower power state. When the signal CKE_PD is set to a logic low (e.g., "0"), the memory 108 may enter a normal operation (e.g., high power) state. The state 402 may be a NO_CKE_PD state. The state 402 may maintain the signal CKE_PD as a logic low. The state 402 may be implemented as an idle state. The state 404 may be an ENTER_CKE_PRCHGE_PD state. The state 404 may set the signal CKE_PD to a logic high. The state 406 may be a CKE_PRCHGE_ACTIVE state. In the state 406, the signal CKE_PD may be maintained high. The state 408 may be a CKE_PRCHGE_PD_EXIT state. In the state 408, the signal CKE_PD may be set low.

The signal CKE_PD_EN may be a configuration bit that the microprocessor may set to high or low. If high, the state machine 400 is enabled to perform power-down precharge control. Otherwise, the precharge power down state 404 is not entered. The signal MEMORY_IDLE may be generated from the memory state tracking circuit 216. The signal MEMORY_IDLE generally indicates that the memory circuit 108 may enter a low power state. In one example, all of the DDR memory banks of the memory circuit 108 may be precharged and idle, therefore allowing the memory circuit 108 to enter a precharge power-down state. The signal NO_WAKEUP generally indicates that the signal WAKEUP is low (e.g., set to !WAKEUP). The signal NO_WAKEUP may also indicate that the signal WAKEUP is equal to 0. The signal NO_REFRESH is normally received from the refresh control logic circuit 210. The signal NO_REFRESH may indicate that a refresh is not needed (e.g., !REFRESH). The signal NO_REFRESH may also indicate that the signal REFRESH is equal to 0. The signal T_CKE_MIN_MET may be generated from the memory timing parameter tracking circuit 218. The signal T_CKE_MIN_MET may indicate that the tCKE timing parameter has been met. The signal T_XP_MIN_MET may be generated from the memory timing parameter tracking block 218. The signal T_XP_MIN_MET normally indicates the tXP timing parameter has been met.

Figure 4:
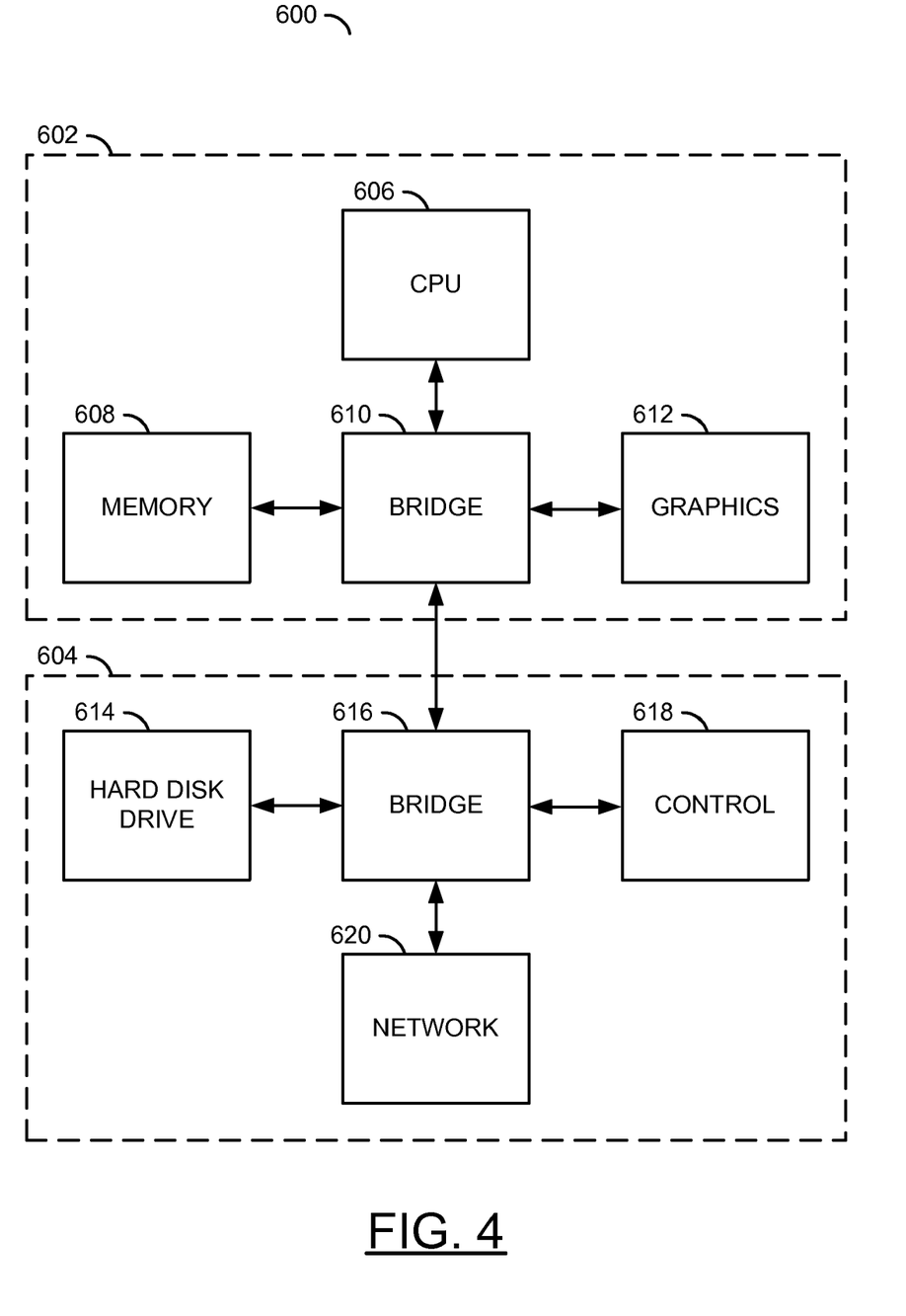
FIG. 4 is a computer system with hard disk drives.

Referring to FIG. 4, a computer system 600 with a hard disk drive is shown. The system 600 may comprise a CPU subsystem circuit 602 and an I/O subsystem circuit 604. The circuit 602 generally comprises a CPU circuit 606, a memory circuit 608, a bridge circuit 610 and a graphics circuit 612. The circuit 604 generally comprises a hard disk drive 614, a bridge circuit 616, a control circuit 618 and a network circuit 620.

Figure 5:
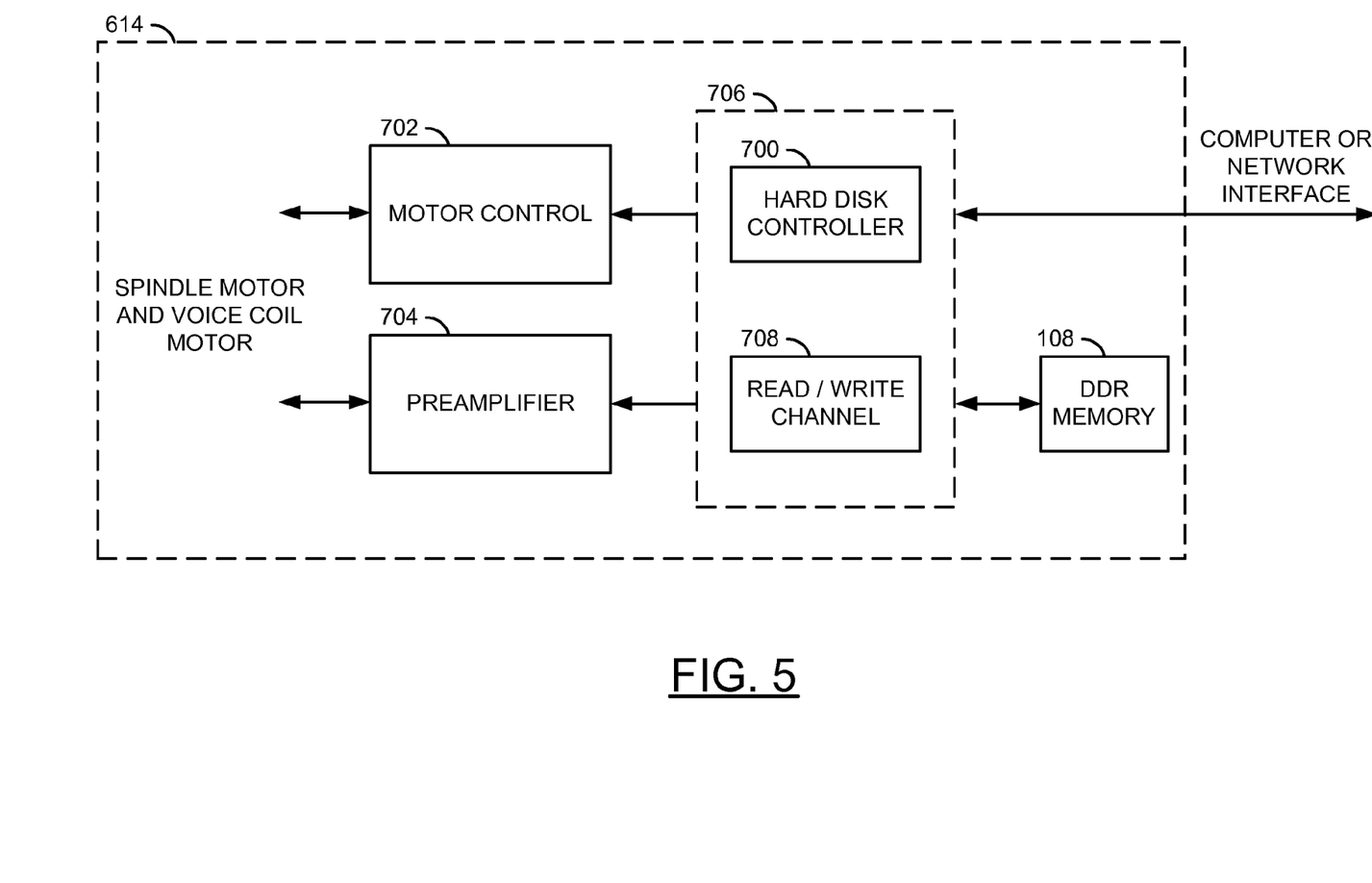
FIG. 5 is a block diagram of a hard disk drive.

Referring to FIG. 5, a block diagram of a hard disk drive 614 is shown. The hard disk drive 614 generally comprises the DDR memory circuit 108, a motor control circuit 702, a preamplifier circuit 704 and a system-on-chip circuit 706. The circuit 706 may comprise a hard disk controller circuit 700 and a read/write channel circuit 708. The hard disk controller circuit 700 may transfer data between a drive and a host during read/write. The hard disk controller circuit 700 may also provide servo control. The motor control circuit 702 may drive a spindle motor and a voice coil motor. The preamplifier circuit 704 may amplify signals to the read/write channel circuit 708 and for head write data.

The hard disk controller 700 may use the external DDR SDRAM memory 108 to store various types of data. Whenever the memory 108 is not in an active use, power consumption of the external memory 108 may be reduced by deasserting the signal CKE. However, the memory controller 104 may not be aware ahead of time when a memory access will next be requested. Without the system 100, there is a possibility of a performance loss when the power down feature is used. Such a performance loss may be reduced and/or eliminated by implementing the arbiter circuit 110 to alert the memory controller 104 when the arbiter circuit 110 receives a request for memory access. The early indication may allow the memory controller 104 to activate the signal CKE earlier than otherwise possible.

Figure 6:
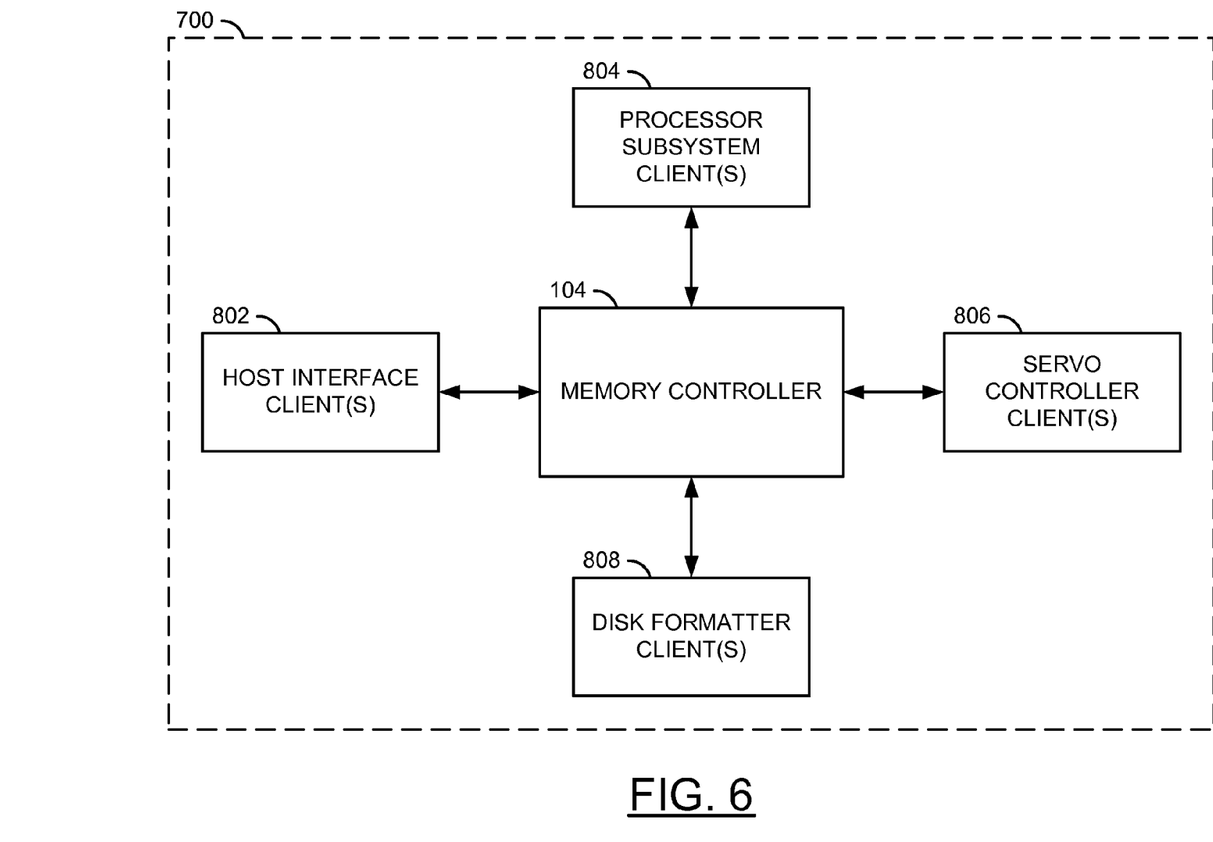
FIG. 6 is a block diagram of a hard disk controller.

Referring to FIG. 6, a block diagram of a hard disk controller 700 is shown. The hard disk controller 700 generally comprises the memory controller circuit 104, a host interface client circuit 802, a processor subsystem client circuit 804, a servo controller client circuit 806 and a disk formatter client circuit 808. In one example, the circuit 804 may be a dual ARM processor subsystem. However, the particular type of processor implemented may be varied to meet the design criteria of a particular implementation. The host interface client circuit 802 may process transfer requests from a computer or network interface. The host interface client circuit 802 may also transfer data to and/or from the memory controller circuit 104 and a computer or network interface. The disk formatter client circuit 808 may move data between the memory controller circuit 104 and media. The disk formatter client circuit 808 may also implement error correcting code (ECC).

The processor subsystem client circuit 804 may configure the registers in the memory controller 104 and block 106 for the purpose of performing initialization and training sequences to the memory controller 104, the circuit 106 and/or the memory circuit 108. The servo controller client circuit 806 may perform the hard disk controller servo functions. The servo controller client circuit 806 may use tables to perform the servo functions. The tables may be stored in the memory circuit 108. The memory controller circuit 104 may provide arbitration access for the host interface client circuit 802, the processor subsystem client circuit 804, the servo controller client circuit 806, the disk formatter client circuit 808 and/or any other circuit requiring access to the memory circuit 108.

As would be apparent to those skilled in the relevant art(s), the signals illustrated in FIGS. 1-6 represent logical data flows. The logical data flows are generally representative of physical data transferred between the respective blocks by, for example, address, data, and control signals and/or busses. The system represented by the circuit 100, and the various sub-components, may be implemented in hardware, software or a combination of hardware and software according to the teachings of the present disclosure, as would be apparent to those skilled in the relevant art(s).

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more integrated circuits, one or more chips or die arranged as flip-chip modules and/or multi-chip modules or by interconnecting an appropriate network of conventional component circuits, as is described herein, modifications of which will be readily apparent to those skilled in the art(s).

While the invention has been particularly shown and described with reference to the preferred embodiments thereof, it will be understood by those skilled in the art that various changes in form and details may be made without departing from the scope of the invention.

The invention claimed is:

1. An apparatus comprising:
a plurality of buffers each configured to generate an access request signal in response to a respective one of a plurality of channel requests received from a respective one of a plurality of clients; and
a memory controller circuit configured to generate a clock enable signal in response to said plurality of access request signals, wherein said clock enable signal is configured to initiate entering and exiting a power savings mode of a memory circuit.

2. The apparatus according to claim 1, wherein said memory controller comprises:
an arbiter circuit configured to generate (i) a transfer request signal in response to each of said access request signals and (ii) an alert signal in response to each of said access request signals.

3. The apparatus according to claim 2, wherein said alert signal is generated one or more clock cycles ahead of said transfer request signal.

4. The apparatus according to claim 2, wherein said memory controller further comprises:
a protocol engine circuit configured to generate (i) a transfer protocol signal in response to said transfer requests and (ii) said clock enable signal in response to said alert signal.

5. The apparatus according to claim 2, wherein said alert signal is generated before said transfer request signal when said apparatus is operating in said power savings mode.

6. The apparatus according to claim 4, wherein said power savings mode is initiated when (i) said protocol engine circuit returns to an idle state and (ii) said memory circuit is pre-charged.

7. The apparatus according to claim 4, wherein said protocol engine circuit comprises a state machine configured to enter and exit said power savings mode.

8. The apparatus according to claim 4, wherein said transfer protocol signal is generated before said clock enable signal.

9. The apparatus according to claim 4, wherein said alert signal is generated before said transfer protocol signal.

10. The apparatus according to claim 1, wherein each of said access request signal is received directly from a respective one of said plurality of clients.

11. The apparatus according to claim 1, wherein said memory controller circuit ensures that said clock enable signal is asserted before a refresh command is presented to said memory.

12. The apparatus according to claim 1, wherein said memory controller circuit de-asserts said clock enable signal when said memory controller circuit is idle.

13. The apparatus according to claim 1, wherein said memory controller circuit exits said power savings mode to service said plurality of channel requests.

14. The apparatus according to claim 1, wherein said power savings mode is initiated when said plurality of channel requests are not received by said plurality of buffers for one or more clock cycles.

15. The apparatus according to claim 1, wherein said clock enable signal is (i) deasserted when entering said power savings mode of said memory circuit and (ii) asserted when exiting said power savings mode of said memory circuit.

16. The apparatus according to claim 1, wherein said apparatus is implemented as one or more integrated circuits.

17. A method for implementing power savings control in a memory comprising the steps of:
(A) generating an access request signal in response to a respective one of a plurality of channel requests received from a respective one of a plurality of clients; and
(B) generating a clock enable signal in response to said plurality of access request signals, wherein said clock enable signal is configured to initiate entering and exiting a power savings mode of said memory.

18. An apparatus comprising:
a memory controller circuit configured to generate a clock enable signal in response to a respective one of a plurality of channel requests received from a respective one of a plurality of clients; and
a memory interface circuit configured to receive said clock enable signal, wherein said clock enable signal is configured to initiate entering and exiting a power savings mode of a memory circuit.

\* \* \* \* \*